(12) United States Patent
Mukherjee et al.

(10) Patent No.: US 6,806,880 B1
(45) Date of Patent: Oct. 19, 2004

(54) SYSTEM AND METHOD FOR EFFICIENTLY CONTROLLING A GRAPHICS RENDERING PIPELINE

(75) Inventors: Shrijeet Mukherjee, Mountain View, CA (US); David M. Blythe, San Carlos, CA (US); David G. Yu, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 306 days.

(21) Appl. No.: 09/688,978

(22) Filed: Oct. 17, 2000

(51) Int. Cl.[7] ............................................. G06T 1/20
(52) U.S. Cl. ...................... 345/506; 345/545; 345/539; 345/522; 345/556
(58) Field of Search ................................ 345/506, 522, 345/539, 422, 556, 558, 559, 545; 712/200–203

(56) References Cited

U.S. PATENT DOCUMENTS 5,517,603 A * 5/1996 Kelley et al.
6,476,808 B1 * 11/2002 Kuo et al.

OTHER PUBLICATIONS

Montrym, J.S., et al., "InfiniteReality: A real–time graphics system," *Computer Graphics Proceedings*, Aug. 3–8, 1997, 293–301.

* cited by examiner

*Primary Examiner*—Matthew C. Bella
*Assistant Examiner*—Hau Nguyen
(74) *Attorney, Agent, or Firm*—Woodcock Washburn LLP

(57) ABSTRACT

A system and method for controlling graphics rendering pipelines. The pipeline is unstalled in response to a display interval complete signal which allows pipeline processing to proceed even at the beginning of a tolerance interval. A stall controller unstalls processing of the graphics data in the graphics rendering pipeline when a display interval complete signal has been generated. A stall token installer inserts stall tokens in between frames of the graphics data. A queue stores frame complete markers in an order matching the order of stall tokens inserted in between frames of graphics data.

14 Claims, 4 Drawing Sheets

SYSTEM AND METHOD FOR EFFICIENTLY CONTROLLING A GRAPHICS RENDERING PIPELINE

BACKGROUND OF THE INVENTION

1. Field of the Invention

The present invention is related generally to computer graphics systems, and more particularly to a computer tool for making the graphics rendering process more efficient.

2. Related Art

In today's technological climate, the availability of computers, combined with their use in both business and pleasure, has led to an ever increasing demand for sophisticated computer tools, games, and processing techniques. The more sophisticated the desired operations, the more a computer's processing power is taxed, and the more valuable efficiency becomes. Software programmers, hardware designers, and operators alike are constantly looking for ways to improve speed, efficiency, and/or processing power from their software, hardware and applications. This desire is especially concentrated in the computer graphics field.

The popularity of the computer has led to an enormous rise in the popularity of computer applications. At the same time, an ever more sophisticated industry has demanded computer tools for applications such as flight simulators, sophisticated presentation applications, realtime navigation tools, computer aided design and testing, weather forecasting, and the like. Each presents new challenges to the computer graphics field.

A computer graphics rendering pipeline supports each of the above mentioned applications. An application passes graphics data to a computer graphics rendering pipeline. The pipeline then processes the graphics data for display on a computer monitor, television screen, or other similar device for displaying visual media. In applications where the output is rapidly changing, such as flight simulators and many computer games, the efficiency of the rendering pipeline is vital to overall system performance. Improving the processing efficiency in each stage of a graphics pipeline is desired. It is this graphics rendering pipeline that the current invention seeks to improve.

A graphics rendering pipeline consists of a number of stages. Processing is performed in each stage. Processing performed in subsequent or "downstream" stages is dependent upon processing performed in earlier or "upstream" stages. Stages can be implemented as units in software, firmware, and/or hardware. A stage can have a fixed amount of buffering.

In practice a tolerance is provided in a stage. Tolerance is the amount of extra capacity built into a stage to allow a guaranteed amount of work to be processed by the pipeline. The maximum tolerance of any unit in a pipeline determines the maximum effective tolerance of the pipeline as a whole. In some cases, a stall token is passed from an upstream unit to a downstream unit. The stall token is a marker that causes the subsequent pipeline unit to stall when the token is received at the subsequent pipeline unit. A period of inefficiency arises when a unit (or application) must wait for a downstream operation to complete while intervening unit(s) have unused processing capacity. A stalled pipeline unit (i.e., a unit that has received a stall token) can be inefficient when it is stalled waiting for a downstream operation to complete.

Consider the example of double-buffered system. In a non-double-buffered system, the increment by which one can increase the amount of data buffered is enough frame buffer memory to hold an additional complete frame. This increment (equal to the size of a frame) can be prohibitively inefficient. There is a motivation to increase processing efficiency in stages preceding a display stage with double-buffering thus allowing processing to proceed even when the current buffer being displayed has not been consumed totally. There is a further need to increase the efficiency of preceding stages, such as, the geometry stage, to avoid unnecessary waiting or stall periods.

An example graphics rendering pipeline with double-buffering consists of three basic stages. This example is illustrative and not intended to limit the present invention. As shown in FIG. 1, this example pipeline consists of a geometry stage 110, a raster stage 120, and a display stage 130. Graphics data is submitted by an application to the pipeline for processing in pipeline operations. Each image, or scene, to be rendered and displayed at a given display interval is referred to as a frame.

Geometry data (also called geometric data, primitive data or primitives) representing a frame to be rendered is input to the geometry stage 110. Geometry data for each respective frame of graphics data is separated by a frame complete marker ($f_c$) FIG. 1 shows an example of three frames of geometry data ($\Delta_1$–$\Delta_3$) 105, separated by frame complete markers ($f_{c1}$–$f_{c3}$) being passed from an application (not shown) to geometry stage 110. Frame markers are commands by which an application specifies frame boundaries. The geometry data is then processed on a frame by frame basis by the geometry stage 110, raster stage 120, and display stage 130 in succession. In such a double-buffered system, at the same time the current frame is being displayed from pixel data in a front buffer 129, rendering of the following frame occurs where results are drawn to the back buffer 127. A swap buffer switch 125 alternates which buffer is currently being drawn, and which buffer is currently being displayed. Once the current frame is rendered and displayed, a vertical retrace signal is sent to the head of the pipeline ordering the next frame to enter the rendering pipeline and begin the rendering process.

Two timing diagrams of a normal scheme 150 and a problem scheme 160 that has incurred a frame drop 162 are also shown in FIG. 1. The diagrams further illustrate the motivation for extra capacity in stages of a multi-buffering pipeline. The display interval 152 controls the rate at which the display stage 130 processes data. The tolerance interval 156, is a predetermined, yet flexible, amount of time. In one example, the tolerance interval 156 is used by system designers to account for the differing frame rendering times 154 that often occur in complex applications. Setting an appropriate duration of the tolerance interval 156 however involves trade-offs. Since the display interval 152 is typically fixed, increasing tolerance interval 156 reduces the frame rendering time (FRT) 154. On the other hand, decreasing tolerance interval 156 runs a risk of exceeding the display interval 152 resulting in dropped frames. A dropped frame 162 typically manifests itself as a flicker in the display medium, and it affects the visual quality of the running application.

One problem that occurs in conventional graphic pipeline processing is that a high amount of dead time can occur during tolerance interval 156. For instance, dead time can occur when an application must wait for a vertical retrace signal before it starts loading a geometry stage 110. In this example pipeline, this results in deadtime or a stall where geometry stage 110 is idle. This deadtime wastes host bandwidth available during this period, and also incurs startup lag when the pipeline is restarted.

The current invention addresses the above described problems that can occur in a multi-buffered system.

SUMMARY OF THE INVENTION

The present invention meets the above-mentioned needs by providing a system, method, and computer program product for providing increased processing efficiency in at least one stage of multi-buffered graphics rendering pipeline. The present invention reduces or eliminates dead-time in a rendering pipeline. In one example, the present invention allows a geometry stage (and other processing stages) to be used more efficiently in that the geometry stage can process data even during a portion of a tolerance interval. This more efficient processing is also referred to as "buying back" what would otherwise be "deadtime" in a stage during the tolerance interval.

In one embodiment, a queue is instantiated to keep track of the sequence of frames that are allowed to go forward. This data can go forward even when a buffer such as a back buffer is waiting for a vertical retrace signal. The data for the current frame that is issued from an application is allowed to proceed through the first stage of the rendering pipeline, and is then stalled.

The system includes a frame boundary marker queue and a stall token installer established at the head of the rendering pipeline. The system also includes a stall controller comprising the software control logic for overall system coordination. The system increases the efficiency in a graphics rendering pipeline by effectively reducing the tolerance period.

The method increases the efficiency of at least one stage of a multi-buffered graphics rendering pipeline. According to an embodiment of the present invention, the method adds a queue to the head of the graphics rendering pipeline. The queue stores frame boundary markers. The method also installs at the same point a corresponding stall token. With this queue established, and the stall tokens inserted, the first stage of the rendering process continues for the data stream, regardless of the state of the remainder of the rendering pipeline. The pipeline is then stalled and subsequently unstalled, when appropriate, according to the stalling logic at the end of the geometry stage. By allowing the first stage of the rendering to proceed, the overall efficiency of the graphics rendering pipeline is improved by the amount of time it takes to complete the remaining stages of the pipeline minus the time the frame would have taken, if the invention had not been implemented.

One advantage of the present invention is that it takes advantage of the dead-time that would normally occur if the rendering time of the running application is less than the display time. By efficiently making use of this dead-time, the problem of a dropped frame can often be avoided.

Another advantage of the present invention is that when the swap buffer operation is called, the primitive data of the next frame has already cleared in the first stage of the pipeline. Any non-raster operations going towards the texture units may proceed at full speed.

Another advantage of the present invention is that it is easily implemented in any multi-buffered system that experiences similar dead-time, and has a stage in the process which lends itself to being stalled.

Further features and advantages of the invention, as well as the structure and operation of various embodiments of the present invention, are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE PREFERRED EMBODIMENTS

I. Overview and Discussion

The present invention provides a method, system, and computer program product for increasing efficiency in graphics rendering pipelines. The present invention is described in terms of an algorithm used by a graphics software interface between applications and graphics hardware. Description in these terms is provided for convenience only. It is not intended that the invention be limited to the application in this example environment. In fact, after reading the following description, it will become apparent to a person skilled in the relevant art how to implement the invention in alternative environments known now, or developed in the future.

II. Terminology

To more clearly delineate the present invention, an effort is made throughout the specification to adhere to the following term definitions as consistently as possible.

"Display interval" is the time allotted to graphics hardware to display the rendered image on a given medium, typically a computer monitor or television set. This time is usually determined by the characteristics of the hardware, and usually does not vary for any given application.

"Frame rendering time" or "FRT" is the time it takes for one or more stages of a graphics rendering pipeline to convert primitive data input from an application to an image ready for display.

"Tolerance interval" or "T" is the difference between the frame rendering time and the display interval. It is designed to allow frame rendering times to vary without exceeding the display interval.

"Swap buffer" is the end of a frame marker from the application and is issued at the end of a frame rendering time (FRT) and at the beginning of a tolerance interval (T). The selection of a new buffer to display happens at the end of a display interval.

III. Controlling the Pipeline

The present invention is directed to controlling a graphics rendering pipeline by making use of previously unused time remaining in a tolerance interval.

Figure 1:
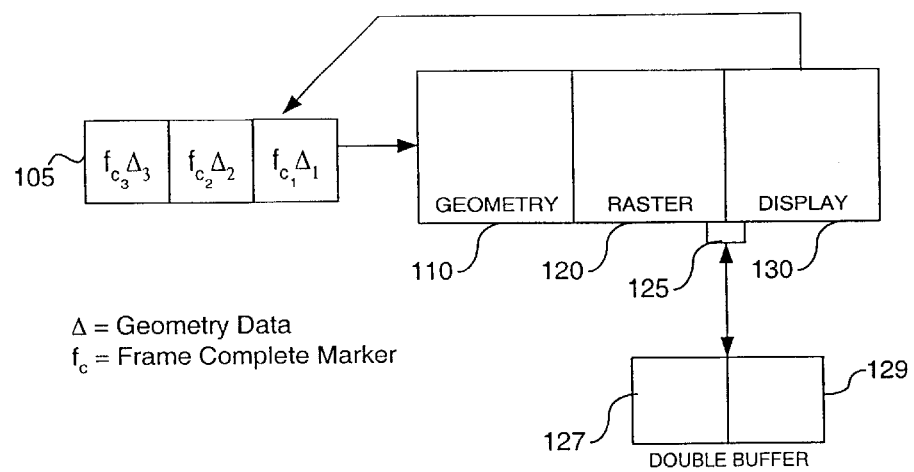
FIG. 1 depicts a conventional, three-stage, graphics rendering pipeline.
Figure 1:
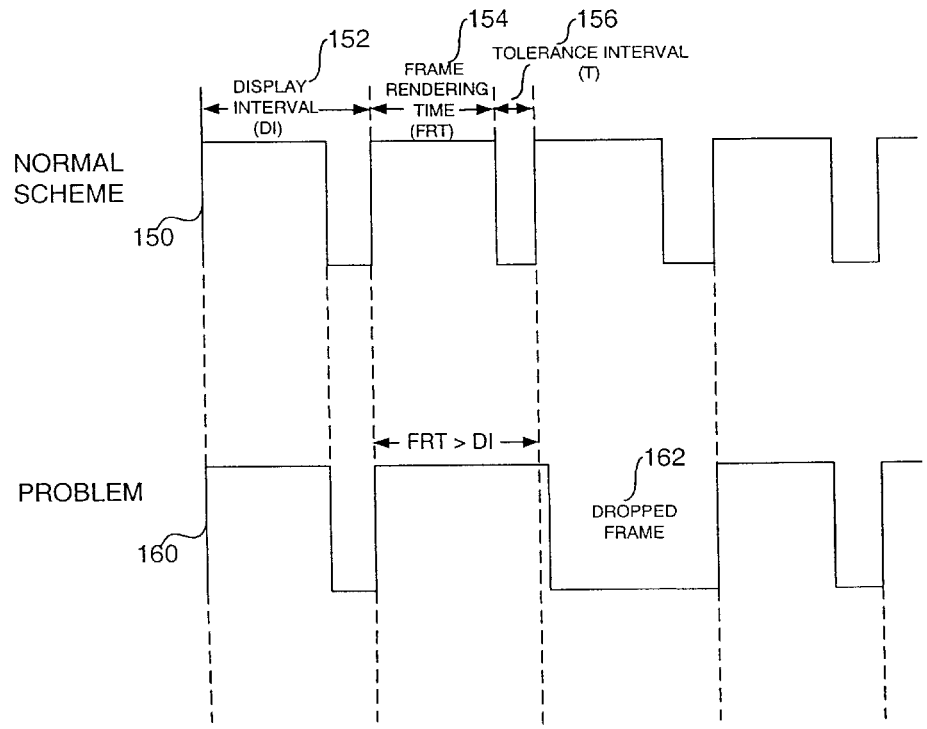
Figure 2:
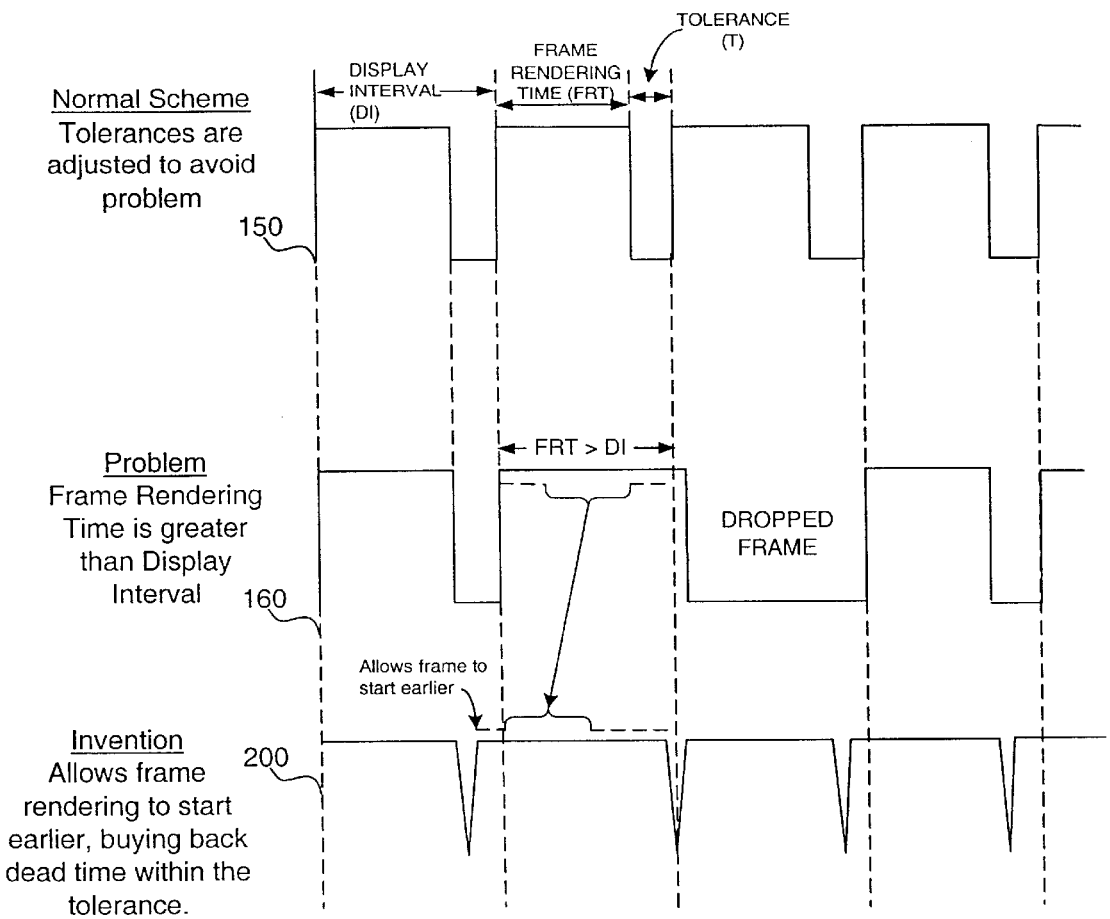
FIG. 2 depicts a potential problem that can occur in a conventional graphics rendering pipeline, as well as the solution implemented by an embodiment of the current invention.
Figure 3:
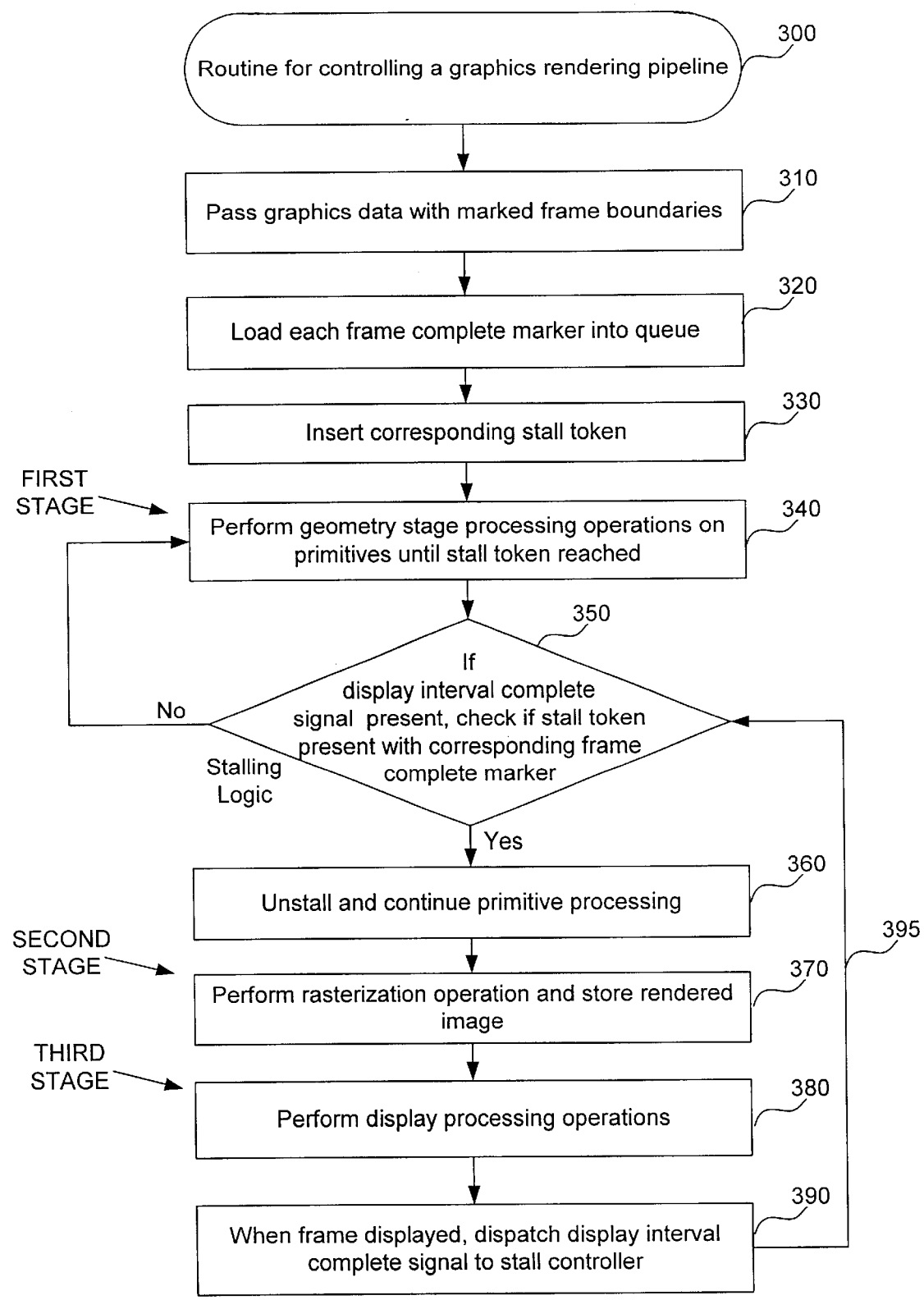
FIG. 3 is a flow chart illustrating a method according to one embodiment of the invention.

This is accomplished by a method which allows the rendering process to begin at the beginning of a tolerance interval (see timeline 200 in FIG. 2). As demonstrated in the double-buffering example of FIG. 2, this increased efficiency can have the effect of preventing the occurrence of a dropped frame and the degradation in visual quality that results. The invention recovers potentially unused time. Processing, such as frame rendering, can occur at the beginning of a tolerance interval (even before a swap buffer operation is completed). The components of the system are depicted, in one embodiment, in FIG. 4. The operation of the system and its components will be described with respect to the routine depicted in FIG. 3.

The System

The host 400 is a computer or like system wherein a running application 405 to be rendered and displayed, is located and implemented. Running application 405 can be any type of software, such as, a computer program, computer game, simulation tool, drafting tool, editing tool, etc. The output of running application 405 generally takes the form of graphics data 105. For example, graphics data 105 can include any type of primitive data, such as, data describing polygons, lines, points, bitmaps, and/or images.

The host 400 sends the graphics data 105 to the graphics rendering pipeline 420. Graphics rendering pipeline 420 can be any type of graphics rendering pipeline. In one example, graphics rendering pipeline 420 includes a geometry stage 110, a raster stage 120, and a display stage 130. Graphics rendering pipeline 420 performs geometry operations first, followed by the raster operations, and ending with the display operations. Other stages and units (and processing operations) can be used as would be apparent to a person skilled in the art given this description. The output of the raster stage is stored in a number of frame buffers, including but not limited to, double frame buffers 127 and 129, prior to display.

The present invention is depicted, in one embodiment, in controller 460. Controller 460 includes a stall token installer 464 coupled to a frame complete queue 462 and a stall controller 466 coupled between geometry stage 110 and frame complete queue 462. Stall token installer 464 and a stall controller 466 can be any type of control logic implemented in software, firmware, hardware, or any combination thereof. In another embodiment, stall token installer 464 and stall controller 466 can be provided as software in a computer program product. A computer program product is used to generally refer to a storage unit or disk that can store software (such as a removable storage unit or a hard disk) for controlling a processor. Frame complete queue 462 can be any type of data storage device implemented in hardware, firmware and/or software.

Stall token installer 464 acts on graphics data 105 before it enters the rendering pipeline. Stall token installer 464 acts to strip the existing frame complete markers from the primitive data and place them in the frame complete queue 462. The stall token installer 464 then acts to place into the primitive data stream a unique stall token that directly corresponds to one frame complete marker. Note that the stall token installer 464 does not delay or prevent the primitive data from entering the first stage of the rendering pipeline 420. The stall token inserted into the primitive data sequence by the stall token installer 464 has the effect of stalling the rendering pipeline after each frame of data has been processed in the geometry stage processing operations. For example, a frame of primitive data processed in the geometry stage will not proceed to the next stage (such as the raster stage) unless ordered (unstalled) by stall controller 466.

Figure 4:
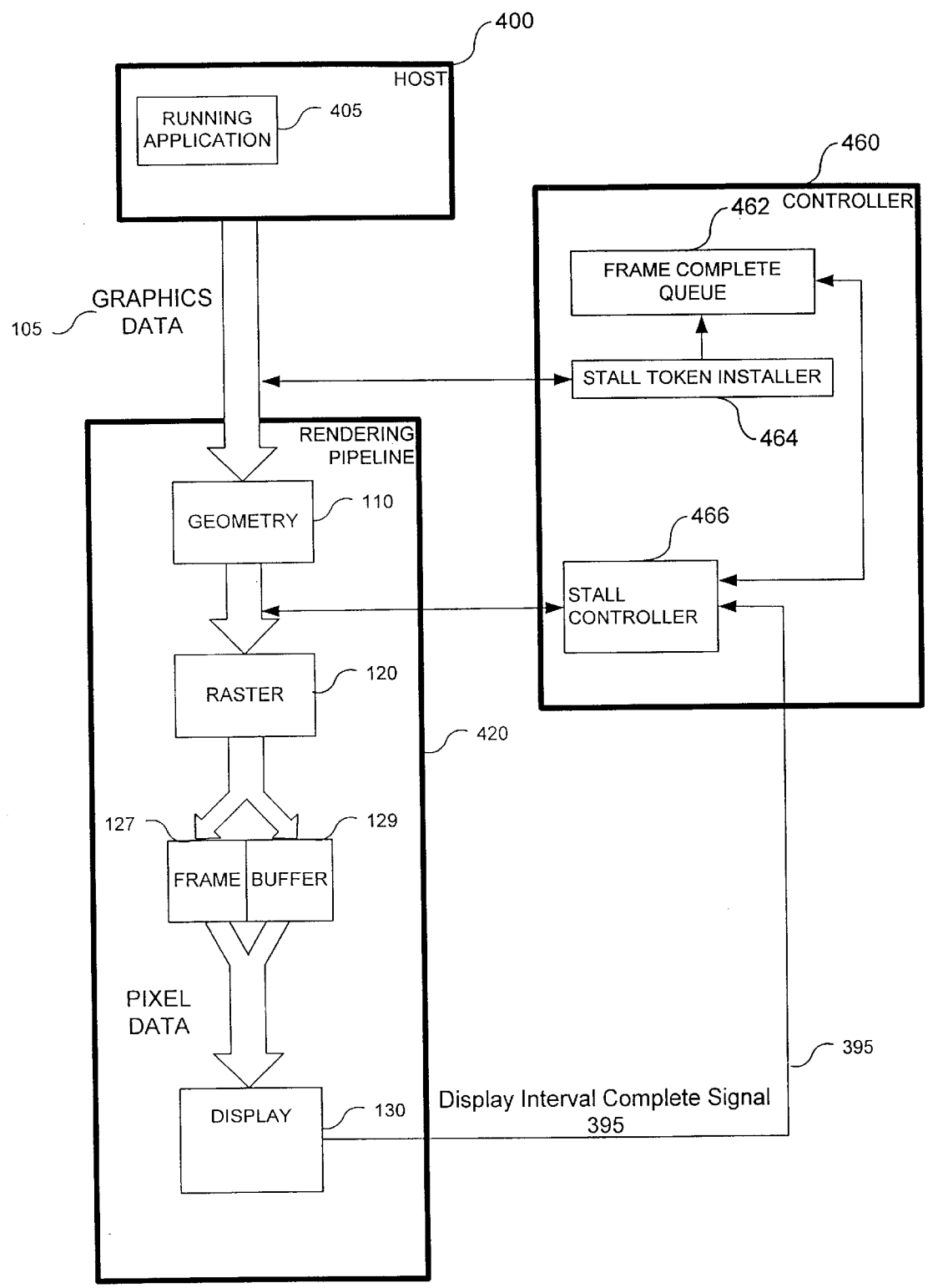
FIG. 4 depicts a system embodiment of the invention.

The system described in FIG. 4 can be implemented in a number of ways. Each of the separate elements depicted within the controller 460 can be implemented either as a stand alone function, or integrated within the host 400, the rendering pipeline 420, or even within the application 405 itself.

The Operation

A routine 300 for controlling a graphics rendering pipeline (steps 310–390) according to one embodiment of the present invention will now be described. In the interest of brevity, routine 300 will be described with respect to the operation of controller 460 in the system shown in FIG. 4. Routine 300 of the present invention is not necessarily intended to be limited to this structure and can be used in other arrangements as would be apparent to a person skilled in the art given this description.

In step 310, graphics data 105 (such as geometry data for a frame to be rendered) is passed from running application 405. In step 320, stall token installer 464 strips frame complete markers 105 from the graphics data 105 and loads them into frame complete queue 462. Queue 462 is used to temporally order the data as it is processed. Stall token installer 464 then adds a stall token to the primitive data sequence in place of the frame complete marker (step 330).

The primitive data, with the frame complete markers removed and the stall tokens added, is then processed in the processing operations of a first stage (e.g., geometry stage 110) of a rendering pipeline (step 340). Processing proceeds until a stall token in the processed primitive data is reached and the rendering pipeline (including stages 110, 120, and 130) is stalled. Separate control logic (not shown) can be provided in the rendering pipeline to stall the pipeline when a stall token is output from geometry stage 110. Alternatively, the control logic for stalling the pipeline can be incorporated as part of stall controller 466. The stalling of the pipeline can also be selective. For example, all or part of the graphics data can be stalled depending upon the type of traffic. Certain types of graphics data (or traffic) may not be stalled while other types of traffic is stalled—depending upon a particular design or application.

Display interval complete control signal 395 is generated in step 390 by display stage 130 at the end of a display interval (this is the time when a swap buffer or change buffer occurs which is at or near the beginning of a tolerance interval). When a display interval complete signal 395 is or has been received by stall controller 466, stall controller 466 then compares the current stall token in the currently stalled unit to the frame complete marker at the head of frame complete queue 462 (step 350). When there is a match, processing in the rendering pipeline is unstalled and the corresponding frame is allowed to continue to the next stage for further processing (e.g., to raster stage 120) in step 360. Any type of well-known matching algorithm can be used to track the processing of the stall tokens and frame complete markers (such as, a one-to-one identity comparison and/or a count of the number of stall tokens processed and the number of frame complete markers processed). If no match is found, pipeline processing can halt and an out-of-order frame condition can be indicated and/or geometry processing in step 340 can continue until a match is found or a time limit is reached.

In this way, the stall tokens have the effect of stalling the pipeline after the first stage. The pipeline is then unstalled, in a order consistent with the frame complete markers stored in frame complete queue 462. Further, the present invention avoids unnecessary dead-time in processing during the tolerance interval. For example, graphics data 105 is continually passed to and processed by geometry stage 110 until a stall token at the end of a frame is reached. Raster stage 120 is also unstalled and begins processing in response to a display interval complete signal 395 generated at or near the beginning of a tolerance interval not the end of a tolerance interval.

Steps 370–390 illustrate the remainder of the processing performed on a frame by the rendering pipeline. Rasterization and any other processing carried out by raster stage 120 occurs in step 370. Display processing operations (e.g., alternately displaying data stored in frame buffers 127 and 129) are carried out in step 380. The data is then displayed on monitor 130. When a frame is displayed and a buffer becomes free, a display interval complete signal 395 is generated and sent to stall controller 466.

IV. Conclusion

While a specific embodiment of the present invention has been described above, it should be understood that it has been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method to control a graphics rendering pipeline having multiple stages that process a sequence of frames of graphics data output from an application for display, comprising the steps of:
   (a) inserting stall tokens in between frames of the graphics data;
   (b) stalling processing of the graphics data in the graphics rendering pipeline, such that the graphics rendering pipeline is stalled in response to a stage of the graphics rendering pipeline encountering an inserted stall token;
   (c) generating a display interval complete signal when a frame of graphics data stored in one buffer of a display stage of the graphics rendering pipeline has been processed for display;
   (d) unstalling processing of the graphics data in the graphics rendering pipeline when the display interval complete signal has been generated; and
   (e) storing stall data representative of frame complete markers and stall tokens, wherein the stall data comprises at least one data sequence associating frame complete markers with stall tokens.

2. The method of claim 1, wherein the graphics rendering pipeline has a tolerance interval, and said generating step (c) generates the display interval complete signal when a frame of graphics data stored in one buffer of a display stage of the graphics rendering pipeline has been processed for display and at a time at the beginning of the tolerance interval.

3. The method of claim 1, further comprising the steps of:
   storing frame complete markers in at least one queue in an order matching the order of stall tokens inserted in between frames of graphics data in said inserting step (a); and
   checking for a match between a stored frame complete marker and a respective stall token, and only performing said unstalling step (d) when a match is found.

4. A system to control the graphics rendering pipeline having multiple states that process a sequence of frames of graphics data output from an application for display, comprising:
   (a) inserting means for inserting stall tokens in between frames of the graphics data;
   (b) stalling means for stalling processing of graphics data in the graphics rendering pipeline, such that the graphics rendering pipeline is stalled in response to a stage of the graphics rendering pipeline encountering an inserted stall token;
   (c) generating means for generating a display interval complete signal when a frame of graphics data stored in one buffer of a display stage of the graphics rendering pipeline has been processed for display;
   (d) unstalling means for unstalling processing of the graphics data in the graphics rendering pipeline when the display interval complete signal has been generated; and
   (e) storage means to store order data associating frame complete markers and stall tokens.

5. A system to control a graphics rendering pipeline having multiple stages that process a sequence of frames of graphics data output from an application for display, comprising:
   a stall token installer that inserts stall tokens in between frames of the graphics data, the graphics pipeline responsive to a stall token such that the graphics rendering pipeline is stalled in response to a stage of the graphics rendering pipeline encountering an inserted stall token; and
   a stall controller that unstalls processing of the graphics data in the graphics rendering pipeline when a display interval complete signal has been generated, wherein the stall controller causes order data to be stored, the order data being representative of an association between frame complete markers and stall tokens.

6. The system of claim 5, wherein the graphics rendering pipeline has a tolerance interval and the display interval complete signal is generated when a frame of graphics data stored in one buffer of a display stage of the graphics rendering pipeline has been processed for display and at a time at the beginning of the tolerance interval, such that said stall controller unstalls processing of the graphics data in the graphics rendering pipeline when the display interval complete signal has been generated and at a time at the beginning of the tolerance interval.

7. The system of claim 5 further comprising:
   at least one queue that stores frame complete markers in an order matching the order of said stall tokens inserted in between frames of graphics data by said stall token installer, wherein said stall controller checks for a match between a stored frame complete marker and a respective stall token, and only unstalls processing of the graphics data in the graphics rendering pipeline when a display interval complete signal has been generated and when a match is found.

8. A computer program comprising a computer usable medium having control logic stored therein for causing at least one processor to control a graphics rendering pipeline, said control logic comprising:
   a. first computer readable program code that enables the at least one processor to insert stall tokens in between frames of the graphics data; and
   b. second computer readable program code means that enables the at least one processor to unstall processing of the graphics data in the graphics rendering pipeline when a display interval complete signal has been generated and to store order data representative of an association between frame complete markers and stall tokens; whereby processing can proceed in the graphics rendering pipeline even during a tolerance interval.

9. A method to control a graphics rendering pipeline having multiple stages that process a sequence of frames of graphics data output from an application for display, comprising the steps of:

(a) inserting stall tokens in between frames of the graphics data;

(b) stalling processing of the graphics data in the graphics rendering pipeline, such that the graphics rendering pipeline is stalled in response to a stage of the graphics rendering pipeline encountering an inserted stall token;

(c) generating a display interval complete signal when a frame of graphics data stored in one buffer of a display stage of the graphics rendering pipeline has been processed for display; and (d) unstalling processing of the graphics data in the graphics rendering pipeline when the display interval complete signal has been generated, wherein the graphics rendering pipeline has a tolerance interval, and said generating step (c) generates the display interval complete signal when a frame of graphics data stored in one buffer of a display stage of the graphics rendering pipeline has been processed for display and at a time at the beginning of the tolerance interval.

10. The method of claim 9, further comprising the steps of storing frame complete markers in at least one queue in an order matching the order of stall tokens inserted in between frames of graphics data in said inserting step (a); and checking for a match between a stored frame complete marker and a respective stall token, and performing said unstalling step (d) only when a match is found.

11. A method to control a graphics rendering pipeline having multiple stages that process a sequence of frames of graphics data output from an application for display, comprising the steps of:

(a) inserting stall tokens in between frames of the graphics data;

(b) stalling processing of the graphics data in the graphics rendering pipeline, such that the graphics rendering pipeline is stalled in response to a stage of the graphics rendering pipeline encountering an inserted stall token;

(c) generating a display interval complete signal when a frame of graphics data stored in one buffer of a display stage of the graphics rendering pipeline has been processed for display;

(d) storing frame complete markers in at least one queue in an order matching the order of stall tokens inserted in between frames of graphics data in said inserting step (a);

(e) checking for a match between a stored frame complete marker and a respective stall token; and (f) only if a match is found in step (e), unstalling processing of the graphics data in the graphics rendering pipeline when the display interval complete signal has been generated.

12. A system to control a graphics rendering pipeline having multiple stages that process a sequence of frames of graphics data output from an application for display, comprising:

a stall token installer that inserts stall tokens in between frames of the graphics data, the graphics pipeline responsive to a stall token such that the graphics rendering pipeline is stalled in response to a stage of the graphics rendering pipeline encountering an inserted stall token; and a stall controller that unstalls processing of the graphics data in the graphics rendering pipeline when a display interval complete signal has been generated, wherein the graphics rendering pipeline has a tolerance interval and the display interval complete signal is generated when a frame of graphics data stored in one buffer of a display stage of the graphics rendering pipeline has been processed for display and at a time at the beginning of the tolerance interval, such that said stall controller unstalls processing of the graphics data in the graphics rendering pipeline when the display interval complete signal has been generated and at a time at the beginning of the tolerance interval.

13. The system of claim 12, further comprising:

at least one queue that stores frame complete markers in an order matching the order of said stall tokens inserted in between frames of graphics data by said stall token installer, wherein said stall controller checks for a match between a stored frame complete marker and a respective stall token, and only unstalls processing of the graphics data in the graphics rendering pipeline when a display interval complete signal has been generated and when a match is found.

14. A system to control a graphics rendering pipeline having multiple stages that process a sequence of frames of graphics data output from an application for display, comprising:

a stall token installer that inserts stall tokens in between frames of the graphics data, the graphics pipeline responsive to a stall token such that the graphics rendering pipeline is stalled in response to a stage of the graphics rendering pipeline encountering an inserted stall token;

a stall controller that unstalls processing of the graphics data in the graphics rendering pipeline when a display interval complete signal has been generated; and at least one queue that stores frame complete markers in an order matching the order of said stall tokens inserted in between frames of graphics data by said stall token installer, wherein said stall controller checks for a match between a stored frame complete marker and a respective stall token, and only unstalls processing of the graphics data in the graphics rendering pipeline when a display interval complete signal has been generated and when a match is found.

* * * * *

UNITED STATES PATENT AND TRADEMARK OFFICE
CERTIFICATE OF CORRECTION

PATENT NO. : 6,806,880 B1
DATED : October 19, 2004
INVENTOR(S) : Shrijeet Mukherjee It is certified that error appears in the above-identified patent and that said Letters Patent is hereby corrected as shown below:

Title page,
Item [75], Inventors, delete "David M. Blythe" and insert -- David R. Blythe --, therefore, and delete "Menlo Park" and insert -- San Francisco --, therefore.

Signed and Sealed this

Third Day of May, 2005

JON W. DUDAS
*Director of the United States Patent and Trademark Office*